(12) United States Patent
Nakamura

(10) Patent No.: US 11,425,364 B2
(45) Date of Patent: Aug. 23, 2022

(54) HEAD-UP DISPLAY SYSTEM FOR VEHICLE

(71) Applicant: SUBARU CORPORATION, Tokyo (JP)

(72) Inventor: Ryota Nakamura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/060,385

(22) Filed: Oct. 1, 2020

(65) Prior Publication Data

US 2021/0105457 A1 Apr. 8, 2021

(30) Foreign Application Priority Data

Oct. 8, 2019 (JP) .............................. JP2019-185044

(51) Int. Cl.
| | |
|---|---|
| *H04N 13/383* | (2018.01) |
| *G02B 30/22* | (2020.01) |
| *H04N 13/133* | (2018.01) |
| *H04N 7/18* | (2006.01) |

(52) U.S. Cl.
CPC .......... *H04N 13/383* (2018.05); *G02B 30/22* (2020.01); *H04N 7/18* (2013.01); *H04N 13/133* (2018.05)

(58) Field of Classification Search
USPC ......................................................... 348/43
See application file for complete search history.

(56) References Cited

U.S. PATENT DOCUMENTS

2013/0002661 A1\* 1/2013 Tanaka ................. H04N 13/128
 345/419
2014/0160012 A1\* 6/2014 Su ...................... G06K 9/00845
 345/156

FOREIGN PATENT DOCUMENTS

| JP | 2017-207551 A | 11/2017 |
| JP | 2019-26198 A | 2/2019 |

\* cited by examiner

*Primary Examiner* — Mikhail Itskovich
(74) *Attorney, Agent, or Firm* — Troutman Pepper Hamilton Sanders LLP

(57) ABSTRACT

A head-up display system for a vehicle includes a head-up display apparatus and an occupant monitoring apparatus. The head-up display apparatus includes a projection device configured to project a three-dimensional image in front of an occupant of the vehicle. The head-up display apparatus is configured to project a projection image with respect to an object present outside of the vehicle. The occupant monitoring apparatus includes an imaging device configured to capture an image of the occupant. The occupant monitoring apparatus is configured to generate personal data related to a sense of sight of the occupant on the basis of the captured image of the occupant. The head-up display apparatus is configured to adjust the projection image in the three-dimensional image on the basis of the personal data generated by the occupant monitoring apparatus, and project, from the projection device, the three-dimensional image in which the projection image is adjusted.

11 Claims, 10 Drawing Sheets

PERSONAL DATA

| ID | REGISTERED IMAGE | PUPILLARY DISTANCE | DOMINANT EYE | VISUAL ACUITY OF BOTH EYES | REFRACTIVE INDICES OF BOTH EYES |
|---|---|---|---|---|---|
| 001 | A | 10 | RIGHT | 1.0/1.0 | R1/L1 |
| 002 | B | 15 | LEFT | 0.5/0.8 | R2/L2 |
| ⋮ | ⋮ | ⋮ | ⋮ | ⋮ | ⋮ |

HEAD-UP DISPLAY SYSTEM FOR VEHICLE

CROSS-REFERENCE TO RELATED APPLICATIONS

The present application claims priority from Japanese Patent Application No. 2019-185044 filed on Oct. 8, 2019, the entire contents of which are hereby incorporated by reference.

BACKGROUND

The technology relates to a head-up display system for a vehicle.

A research for technical innovation of a vehicle, aimed to assist driving performed by an occupant, has been actively carried out.

For example, Japanese Unexamined Patent Application Publication (JP-A) Nos. 2017-207551 and 2019-026198 each disclose a head-up display apparatus that projects a projection image onto a member of a vehicle, such as a windshield.

The head-up display apparatus projects, for example, information on a speed of the vehicle onto a member in front of an occupant, such as the windshield. This configuration allows the occupant, who pays attention to a location ahead of the vehicle, to visually recognize information such as the speed of the vehicle without requiring the occupant to largely move his/her line of sight from the location ahead of the vehicle.

One possible scheme of the head-up display apparatus for the vehicle is to further perform projection of, for example, an attention-seeking mark in an overlaid fashion with respect to an object, such as a mobile body, that is present outside of the vehicle at a location ahead of the vehicle. With this example configuration, it is possible to cause the occupant to pay attention to the object overlaid with the attention-seeking mark.

Performing the projection of the attention-seeking mark in the overlaid fashion with respect to the object present outside of the vehicle, on the other hand, can give the occupant a feeling of strangeness or can make the occupant feel sick.

For example, the occupant tries to focus on the attention-seeking mark when the attention-seeking mark is projected. The attention-seeking mark, however, is in fact projected onto a member such as the windshield, which is different from the object present outside of the vehicle in terms of a sense of distance. Such a difference makes different from each other a state of the line of sight by which the attention-seeking mark becomes easier to see and a state of the line of sight by which the object present outside of the vehicle, to which an attention is to be sought, becomes easier to see. Accordingly, it makes it difficult for the occupant to see one of the attention-seeking mark and the object present outside of the vehicle if the occupant brings his/her line of sight to the other. Under such circumstances, the occupant tends to bring his/her line of sight to both of the attention-seeking mark and the object present outside of the vehicle, and becomes conscious of attempting to bring his/her line of sight to both of them. If the line of sight fails to be focused on both of the attention-seeking mark and the object present outside of the vehicle even despite attempting to bring the line of sight to both of them, the occupant can experience the feeling of strangeness or feel sick due to frequent movement of the line of sight.

SUMMARY

An aspect of the technology provides a head-up display system for a vehicle. The head-up display system includes a head-up display apparatus and an occupant monitoring apparatus. The head-up display apparatus includes a projection device configured to project a three-dimensional image in front of an occupant of the vehicle. The head-up display apparatus is configured to project a projection image with respect to an object that is present outside of the vehicle at a location ahead of the occupant. The occupant monitoring apparatus includes an imaging device configured to capture an image of the occupant. The occupant monitoring apparatus is configured to generate personal data related to a sense of sight of the occupant on the basis of the captured image of the occupant obtained by the imaging device. The head-up display apparatus is configured to adjust the projection image in the three-dimensional image on the basis of the personal data generated by the occupant monitoring apparatus, and project, from the projection device, the three-dimensional image in which the projection image is adjusted.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Figure 1:
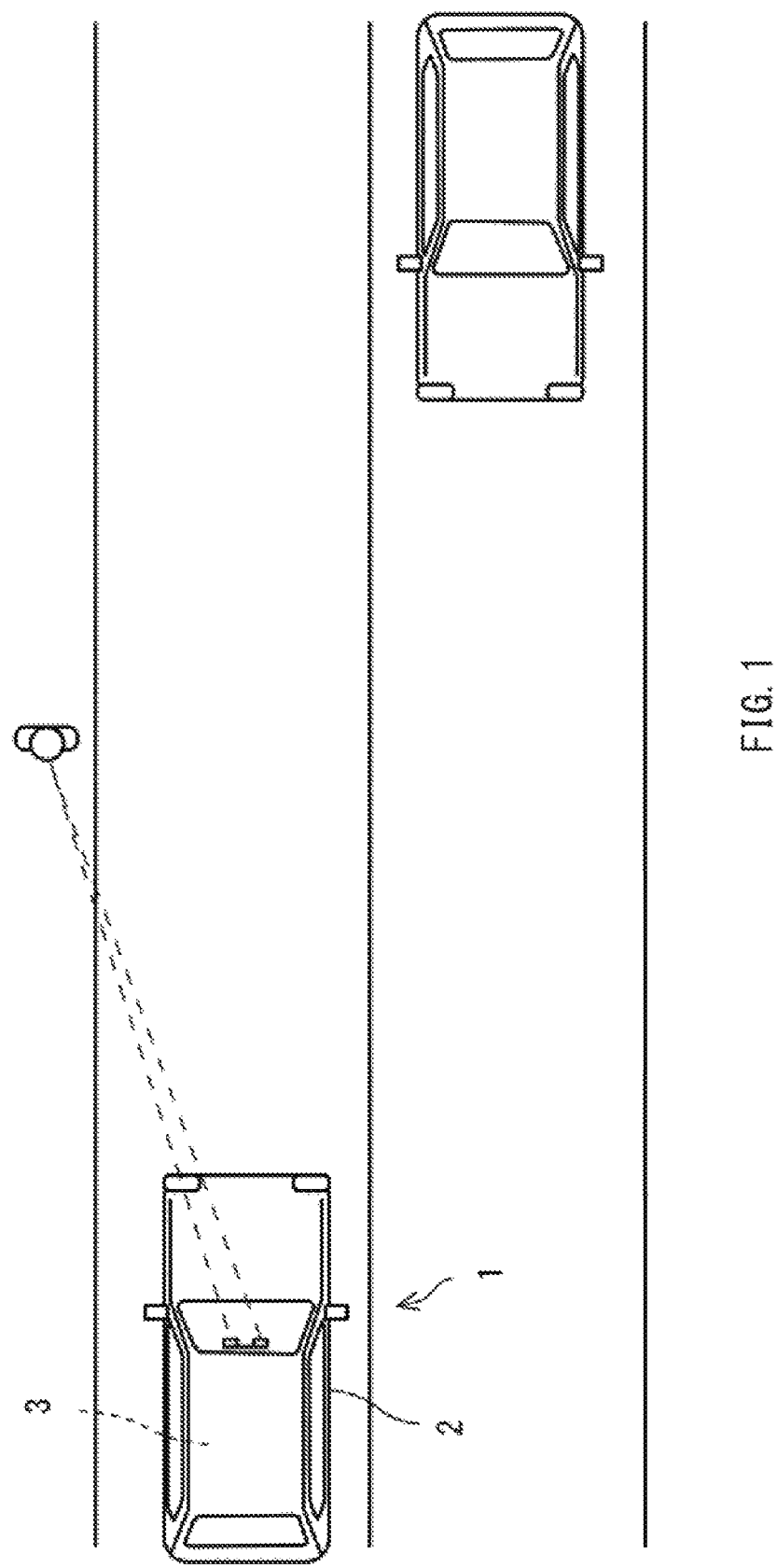
FIG. 1 is an explanatory diagram illustrating a state of traveling of a vehicle including a head-up display system according to one example embodiment of the technology.

One possible alternative scheme of a head-up display apparatus for a vehicle is to project an attention-seeking mark in the form of a three-dimensional projection image by utilizing a factor such as a parallax, instead of projecting, in a planar fashion, the attention-seeking mark onto a location of a member such as a windshield, as disclosed in JP-A Nos. 2017-207551 and 2019-026198.

Nonetheless, projecting the attention-seeking mark in the form of the three-dimensional projection image in such a manner as to be overlaid on an object present outside of the vehicle or as to be positioned near the object still makes the occupant experience the feeling of strangeness and thus makes the occupant move his/her line of sight frequently between the attention-seeking mark and the object present outside of the vehicle, if a mismatch remains between them in terms of a sense of distance as seen from the occupant.

JP-A Nos. 2017-207551 and 2019-026198 each adjust a position, at which an image is to be projected, vertically and horizontally in accordance with a build and a riding posture of the occupant. Unfortunately, it is not possible for JP-A Nos. 2017-207551 and 2019-026198 to favorably solve the difference in terms of the sense of distance between the three-dimensional projection image and the object present outside of the vehicle even if the position at which the image is to be projected is adjusted vertically or horizontally.

It is desirable to provide an improved head-up display system for a vehicle.

In the following, some embodiments of the technology are described in detail with reference to the accompanying drawings. Note that sizes, materials, specific values, and any other factors illustrated in respective embodiments are illustrative for easier understanding of the technology, and are not intended to limit the scope of the technology unless otherwise specifically stated. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. Further, elements that are not directly related to the technology are unillustrated in the drawings.

FIG. 1 illustrates a state of traveling of a vehicle 1 including a head-up display system according to an example embodiment of the technology.

The vehicle 1 may be, for example, an automobile as illustrated in FIG. 1. The vehicle 1 may have a body 2 and a vehicle compartment 3 provided at the middle of the body 2. The vehicle compartment 3 may be a space in which an occupant goes aboard. The occupant who rides the vehicle 1, such as a driver, may operate traveling of the vehicle 1. The vehicle 1 may travel along a lane on the basis of automatic driving or manual driving. The vehicle 1 may execute a driving assist in a case where the vehicle 1 travels on the basis of a traveling operation performed by the occupant. The vehicle 1 may assist both of traveling based on the automatic driving and traveling based on the manual driving. FIG. 1 illustrates an example in which another vehicle 1 travels along an opposing lane and a pedestrian walks at a side strip.

Figure 2:
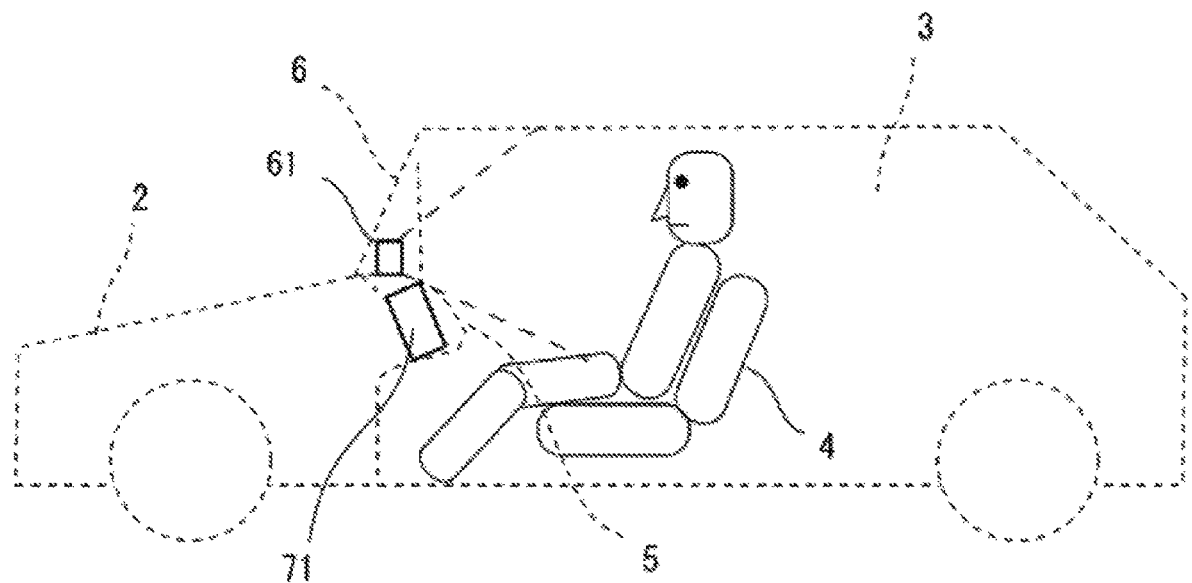
FIG. 2 is an explanatory diagram schematically illustrating a sitting state of an occupant in the vehicle illustrated in FIG. 1.

FIG. 2 is a perspective diagram schematically illustrating a sitting state of the occupant in the vehicle 1 illustrated in FIG. 1 and as viewed from a side of the vehicle 1.

The vehicle compartment 3 of the vehicle 1 illustrated in FIG. 2 may include a seat 4 on which the occupant sits. A dashboard 5 may be provided in front of the seat 4. Above the dashboard 5 is a windshield 6, allowing the occupant to visually recognize a location ahead of the vehicle 1 through the windshield 6 while sitting on the seat 4. The occupant may also be able to visually recognize, through the windshield 6, another vehicle 1 and the pedestrian present ahead of the own vehicle 1.

Figure 3:
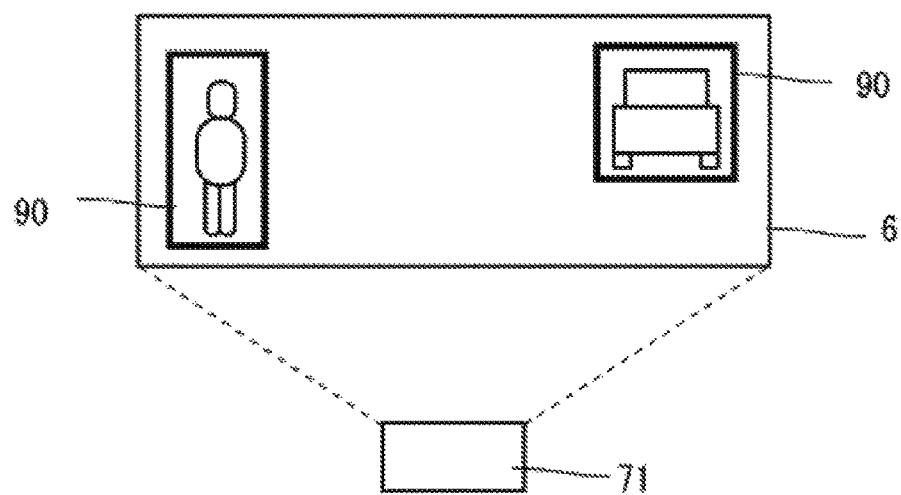
FIG. 3 is an explanatory diagram illustrating a state of projection of a three-dimensional image in the vehicle illustrated in FIG. 1.

FIG. 3 illustrates a state of projection of a three-dimensional image in the vehicle 1 illustrated in FIG. 1.

The three-dimensional image illustrated in FIG. 3 may be projected onto the windshield 6 by a projection device 71 of a head-up display apparatus (a HUD apparatus) 70 provided in the vehicle 1.

The three-dimensional image illustrated in FIG. 3 may be so displayed with respect to each visually-recognizable object that an attention-seeking frame mark 90 is overlaid on each object. The object may be an object, such as a mobile body, present outside of the vehicle 1 at a location ahead of the vehicle 1. In a traveling state illustrated in FIG. 1, the three-dimensional image may be so projected that the attention-seeking frame mark 90 is overlaid on another vehicle 1 and that the attention-seeking frame mark 90 is overlaid on the pedestrian.

The attention-seeking frame marks 90 are projected in the overlaid fashion, allowing the occupant to visually recognize another vehicle 1 and the pedestrian easily even in a case where, for example, the outside of the vehicle 1 is generally dark. With this configuration, it is possible for the occupant to pay attention to the objects on which the attention-seeking frame marks 90 are overlaid.

Performing the projection of the attention-seeking frame mark 90 in the overlaid fashion with respect to the object present outside of the vehicle 1, on the other hand, can give the occupant a feeling of strangeness or can make the occupant feel sick.

For example, the occupant tries to focus on the attention-seeking frame mark 90 when the attention-seeking frame mark 90 is projected. The attention-seeking frame mark 90, however, is in fact projected onto the windshield 6, which is different from the object present outside of the vehicle 1 in terms of a sense of distance. Such a difference makes different from each other a state of the line of sight by which the attention-seeking frame mark 90 becomes easier to see from the occupant and a state of the line of sight by which the object present outside of the vehicle 1, to which an attention is to be sought, becomes easier to see from the occupant. Accordingly, it makes it difficult for the occupant to see one of the attention-seeking frame mark 90 and the object present outside of the vehicle 1 if the occupant brings his/her line of sight to the other. Under such circumstances, the occupant tends to bring his/her line of sight to both of the attention-seeking frame mark 90 and the object present outside of the vehicle 1, and becomes conscious of attempting to bring his/her line of sight to both of them. If the line of sight fails to be focused on both of the attention-seeking frame mark 90 and the object present outside of the vehicle 1 even despite attempting to bring the line of sight to both of them, the occupant can experience the feeling of strangeness or feel sick due to frequent movement of the line of sight.

What is desired is further improvement in the HUD apparatus 70 of the vehicle 1.

A description is given next of an improved method of projecting a projection image such as an attention-seeking frame mark, according to an example embodiment of the technology.

Figure 4:
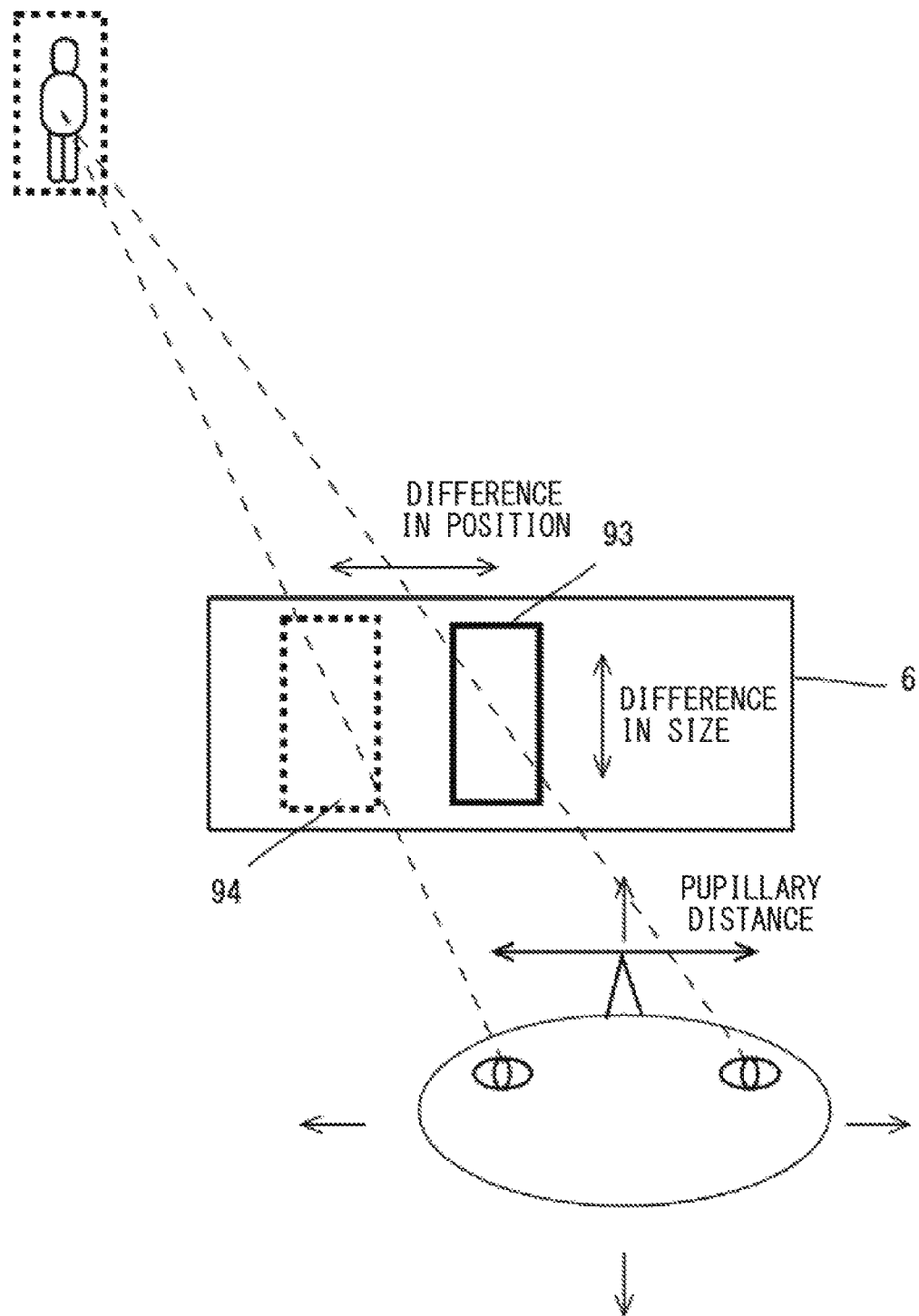
FIG. 4 is an explanatory diagram illustrating a projection method, projection sizes, and a method of adjusting projection positions of attention-seeking frame marks as projection images in the three-dimensional image illustrated in FIG. 3.

FIG. 4 illustrates a projection method, projection sizes, and a method of adjusting projection positions of the attention-seeking frame marks as the projection images in the three-dimensional image illustrated in FIG. 3.

Referring to FIG. 4, the occupant may visually recognize the pedestrian present outside of the vehicle 1 through the windshield 6 on which the attention-seeking frame mark is projected.

In an example illustrated in FIG. 4, the right eye of the occupant may involve the line of sight by which the pedestrian present outside of the vehicle 1 is visually recognized through a middle part of the windshield 6. An attention-seeking frame mark 93 to be visually recognized by the right eye of the occupant may be projected onto the middle part of the windshield 6 that intersects with the line of sight of the right eye.

The left eye of the occupant may involve the line of sight by which the pedestrian present outside of the vehicle 1 is visually recognized through a left part of the windshield 6. An attention-seeking frame mark 94 to be visually recognized by the left eye of the occupant may be projected onto the left part of the windshield 6 that intersects with the line of sight of the left eye.

The projection, thus adjusted as described above, projects the attention-seeking frame mark 93 to be visually recognized by the right eye and the attention-seeking frame mark 94 to be visually recognized by the left eye. This configuration makes it easier for the occupant to visually recognize the attention-seeking frame mark 90 as if a real image of the attention-seeking frame mark 90 is so provided as to surround, in an overlaid fashion, the pedestrian present outside of the vehicle 1.

Figure 5:
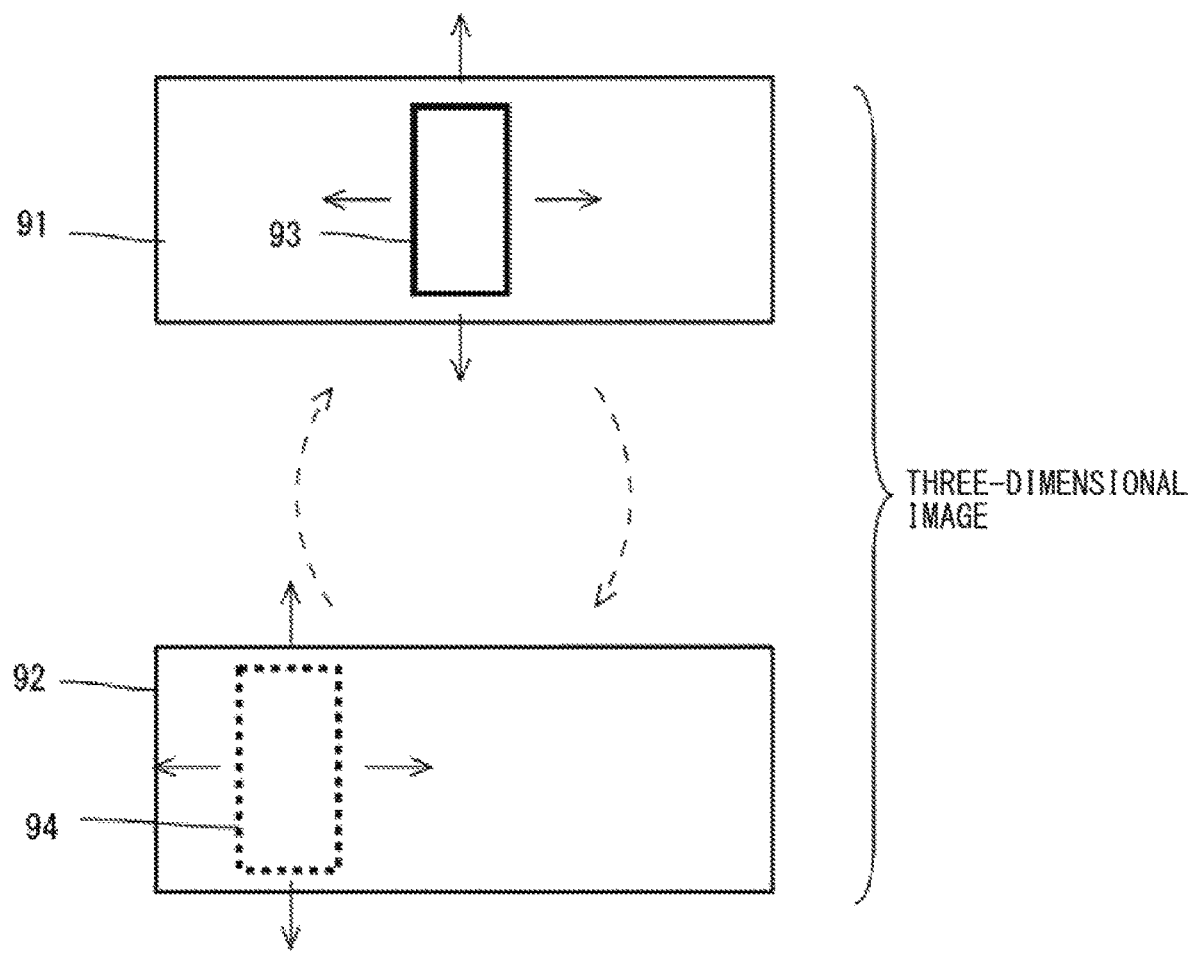
FIG. 5 is an explanatory diagram illustrating a right-eye image and a left-eye image generated as the three-dimensional image illustrated in FIG. 3.

FIG. 5 illustrates a right-eye image 91 and a left-eye image 92 generated as the three-dimensional image illustrated in FIG. 3.

The three-dimensional image illustrated in FIG. 5 may include the right-eye image 91 to be visually recognized by the right eye of the occupant and the left-eye image 92 to be visually recognized by the left eye of the occupant.

The right-eye image 91 to be visually recognized by the right eye may have a projection image of the attention-seeking frame mark 93 at a middle part of the image. A region other than the middle part of the image may be projected as a transparent image.

The left-eye image 92 to be visually recognized by the left eye may have a projection image of the attention-seeking frame mark 94 at a left part of the image. A region other than the left part of the image may be projected as a transparent image.

For example, the projection device 71 of the HUD apparatus 70 may switch between the right-eye image 91 and the left-eye image 92 and project those images alternately to project the three-dimensional image onto the windshield 6.

Figure 6:
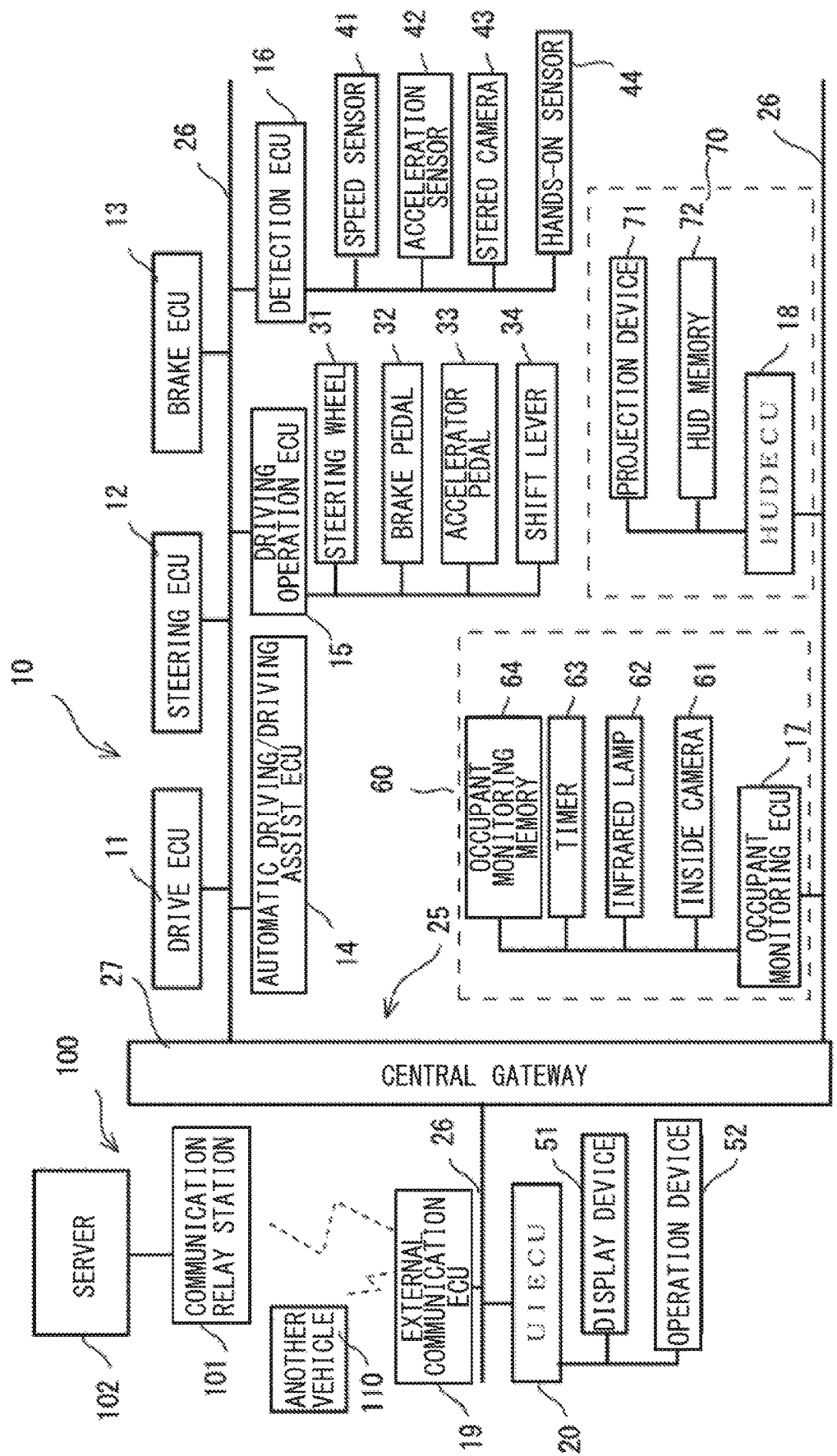
FIG. 6 is an explanatory diagram schematically illustrating a control system of the vehicle illustrated in FIG. 1.

FIG. 6 schematically illustrates a control system 10 of the vehicle 1 illustrated in FIG. 1. FIG. 6 illustrates, together with the control system 10 of the vehicle 1, a traffic information system 100 that communicates with the control system 10.

The vehicle 1 includes an occupant monitoring apparatus 60. The occupant monitoring apparatus 60 may distinguish an occupant who rides the vehicle 1 and monitor the occupant during the automatic driving that is independent from driving performed by the occupant such as the driver, or during the manual driving performed by the occupant.

The vehicle 1 includes the HUD apparatus 70. The HUD apparatus 70 performs projection of the attention-seeking projection image with respect to an object present outside of the vehicle 1 to allow for attention seeking of the object. The object may be a mobile body present ahead of the running vehicle in a traveling direction of the vehicle 1.

These techniques may cooperate with each other organically, which helps to, for example, identify a driver and achieve an advanced driving assist based on the identified driver. This in turn helps to increase convenience and safety of the vehicle 1.

FIG. 6 illustrates two or more controllers included in the control system 10 as represented by control electronic control units (ECUs) incorporated in the respective two or more controllers.

The control system 10 of the vehicle 1 illustrated in FIG. 6 may include: a drive ECU 11; a steering ECU 12; a brake ECU 13; an automatic driving/driving assist ECU 14 included in a traveling controller; a driving operation ECU 15; a detection ECU 16; an occupant monitoring ECU 17 included in the occupant monitoring apparatus 60; a HUDECU 18 included in the HUD apparatus 18; an external communication ECU 19; and an UIECU 20. These control ECUs may be directly coupled to a cable 26 and may be coupled to a central gateway (CGW) 27 via a vehicle network 25. Non-limiting examples of the vehicle network 25 employed in the vehicle 1 may include a controller area network (CAN) and a local interconnect network (LIN). The central gateway 27 may serve as a relay. The control ECUs may communicate with each other on the basis of encrypted data having an own ID that identifies a transmission source and an ID of a destination control ECU. The control ECUs each may transmit data to other control ECUs together in a broadcast fashion, on the basis of encrypted data that does not specify a destination control ECU. The controls ECUs each may receive encrypted data belonging to a destination control ECU identified by the own ID and may use the received encrypted data for a control of the own control ECU. Alternatively, the control ECUs each may receive encrypted data belonging to a destination control ECU identified by a specific ID other than the own ID and may use the received encrypted data for a control of the own control ECU. The central gateway 27 may output received encrypted data to another cable 26, in a case where the encrypted data received from any of the cables 26 is to be transmitted to any control ECU coupled to the other cable 26. With this configuration, the control ECUs illustrated in FIG. 6 are able to transmit and receive the encrypted data mutually.

The drive ECU 11 may receive the encrypted data via the vehicle network 25 to control an unillustrated drive source and an unillustrated transmission provided in the vehicle 1. The drive source may be an engine, a motor, or both. With this configuration, the vehicle 1 is able to accelerate and run.

The steering ECU 12 may receive the encrypted data via the vehicle network 25 to control an unillustrated steering device provided in the vehicle 1. With this configuration, the vehicle 1 is able to change a traveling direction.

The brake ECU 13 may receive the encrypted data via the vehicle network 25 to control an unillustrated brake device provided in the vehicle 1. With this configuration, the vehicle 1 is able to decelerate and stop. The brake ECU 13 may also communicate with the drive ECU 11 via the vehicle network 25 to reduce a rotation of the drive source or to change a gear ratio of the transmission to thereby decelerate the running vehicle 1.

The driving operation ECU 15 may be coupled to operation members including: a steering wheel 31 used to operate traveling of the vehicle 1; a brake pedal 32; an accelerator pedal 33; and a shift lever 34, for example. The driving operation ECU 15 may output the encrypted data to any control ECU such as the automatic driving/driving assist ECU 14 via the vehicle network 25. The encrypted data outputted from the driving operation ECU 15 may include data on operation of any operation member operated by the occupant.

The detection ECU 16 may be coupled to sensors including a speed sensor 41, an acceleration sensor 42, a stereo camera 43, and a hands-on sensor 44, for example. The speed sensor 41 may detect a speed of the vehicle 1. The acceleration sensor 42 may detect an acceleration rate of the vehicle 1. The stereo camera 43 may capture images of an outside environment around the vehicle 1. For example, the stereo camera 43 may capture images of locations including the front, the side, and the rear of the vehicle 1. The hands-on sensor 44 may be provided on the steering wheel 31, and may detect a change in capacitance or a pressure derived from hands of the occupant who operates the steering wheel 31, for example. The detection ECU 16 may acquire a physical quantity detected by any of the sensors coupled to the detection ECU 16, or a physical quantity detected by any device, as a physical quantity detected in the vehicle 1 upon the traveling of the vehicle 1. The detection ECU 16 may output the acquired physical quantity to any control ECU such as the automatic driving/driving assist ECU 14 via the vehicle network 25. The detection ECU 16 may also analyze images of the outside environment obtained by the stereo camera 43 to detect presence of another mobile body present around the vehicle 1. The detection ECU 16 may output, to any control ECU such as the automatic driving/driving assist ECU 14 or the HUDECU 18 via the vehicle network 25, data on a type of the detected other mobile body, data on a relative distance of the detected other mobile body from the own vehicle 1, and data on a direction of the detected other mobile body.

The external communication ECU 19 may communicate with the outside of the vehicle 1. For example, the external communication ECU 19 may communicate with a communication relay station 101 of the traffic information system 100 to transmit and receive communication data between the external communication ECU 19 and a server 102. The external communication ECU 19 may also transmit and receive communication data, via any communication method such as V2X communication, between the external communication ECU 19 and another vehicle 110 traveling near the vehicle 1, or between the external communication ECU 19 and an unillustrated mobile terminal belonging to the pedestrian, for example. The external communication ECU 19 may perform these communications to receive data such as: navigation data to a destination of the vehicle 1; traffic data; or data on a situation around the vehicle 1. The external communication ECU 19 may output the thus-received data to any control ECU such as the automatic driving/driving assist ECU 14 via the vehicle network 25.

The UIECU 20 may be coupled to a display device 51 and an operation device 52, for example. The operation device 52 may include a touch panel overlaid on a display screen of the display device 51, and a plurality of keys. The UIECU 20 may receive the encrypted data related to displaying, and may cause the display device 51 to display an image in a case where the UIECU 20 has received the encrypted data. The UIECU 20 may generate data such as navigation data, on the basis of operation that is performed on the operation device 52 in accordance with the displaying carried out on the display device 51. The UIECU 20 may output the data to any control ECU such as the automatic driving/driving assist ECU 14 via the vehicle network 25.

The automatic driving/driving assist ECU 14 may switch between the automatic driving and the driving assist to control the traveling of the vehicle 1. The automatic driving/driving assist ECU 14 may control the traveling of the vehicle 1 on the basis of various pieces of data acquired via the vehicle network 25. For example, upon the automatic driving, the automatic driving/driving assist ECU 14 may output control data to the drive ECU 11, the steering ECU 12, and the brake ECU 13 to cause the vehicle 1 to travel to the destination in accordance with the navigation data while confirming safety around the vehicle 1. Upon the drive assist, the automatic driving/driving assist ECU 14 may output control data to the drive ECU 11, the steering ECU 12, and the brake ECU 13 on the basis of the data on operation of any operation member operated by the occupant. The control data outputted upon the drive assist may be based on an amount of operation of any operation member that has been adjusted in accordance with, for example, safety around the vehicle 1.

The occupant monitoring ECU 17 may be coupled to an inside camera 61, an infrared lamp 62, a timer 63, and an occupant monitoring memory 64.

The inside camera 61 may be provided in the vehicle compartment 3 and may capture an image of the inside of the vehicle 1. In one embodiment, the inside camera 61 may serve as an "imaging device". The inside camera 61 may be a stereo camera. The inside camera 61 may be provided on an inner surface of the vehicle compartment 3. For example, the inside camera 61 may be provided on the dashboard 5 provided in front of the occupant as illustrated in FIG. 2. This configuration allows the occupant such as the driver riding the vehicle 1 to be captured in the image captured by the inside camera 61. The inside camera 61 may be a wide-angle camera or a 360-degree camera in a case where an image of the inside of the vehicle 1 as a whole is to be captured. The inside camera 61 may repeatedly capture an image of the occupant in the vehicle compartment 3 at a predetermined cycle.

The infrared lamp 62 may emit infrared light toward the occupant such as the driver. The infrared lamp 62 may emit the light having a frequency included in natural light, light from an outside light, or light from a street light. The infrared lamp 62 may adjust an emission intensity, an emission pattern, or any other emission factor to allow the light emitted from the infrared lamp 62 to be distinguished from the natural light. A captured image based on the infrared light emitted from the infrared lamp 62 is obtainable by subtracting an infrared light image captured by the inside camera 61 under a condition in which the infrared lamp 62 does not emit the infrared light, from an infrared light image captured by the inside camera 61 under a condition in which the infrared lamp 62 emits the infrared light.

The timer 63 may measure a timing and a time length.

The occupant monitoring memory 64 may store, for example, a program intended for monitoring an occupant and setting data. The setting data may include later-described personal data 80 for each occupant registered in advance.

The occupant monitoring ECU 17 may load the program from the occupant monitoring memory 64 and execute the program. Thus, the occupant monitoring ECU 17 may serve as a controller of the occupant monitoring apparatus 60.

The occupant monitoring ECU 17 serving as the controller of the occupant monitoring apparatus 60 may control the emission of light to be emitted from the infrared lamp 62 and may acquire the image captured by the inside camera 61.

The occupant monitoring ECU 17 may recognize the occupant including the driver riding the vehicle 1 and monitor the occupant, on the basis of the thus-acquired image captured by the inside camera 61.

The occupant monitoring ECU 17 may generate the setting data such as the personal data 80 related to a sense of sight of the recognized occupant, and may output the setting data to any control ECU such as the automatic driving/driving assist ECU 14 or the HUDECU 18 via the vehicle network 25.

The occupant monitoring ECU 17 may monitor a riding state of the recognized occupant on the basis of the images repeatedly captured by the inside camera 61, and may determine positions in the vehicle 1 of the face and both eyes of the occupant. The occupant monitoring ECU 17 may output data on the determination of the positions to any control ECU such as the HUDECU 18 via the vehicle network 25.

The occupant monitoring ECU 17 may determine the positions of the face and both eyes of the occupant in the vehicle compartment 3 of the vehicle 1 on the basis of factors including an installation position, an orientation, and an angle of view of the inside camera 61 in the vehicle compartment 3, regardless of whether the inside camera 61 is the stereo camera or any other type of camera.

Figures 7, 8:
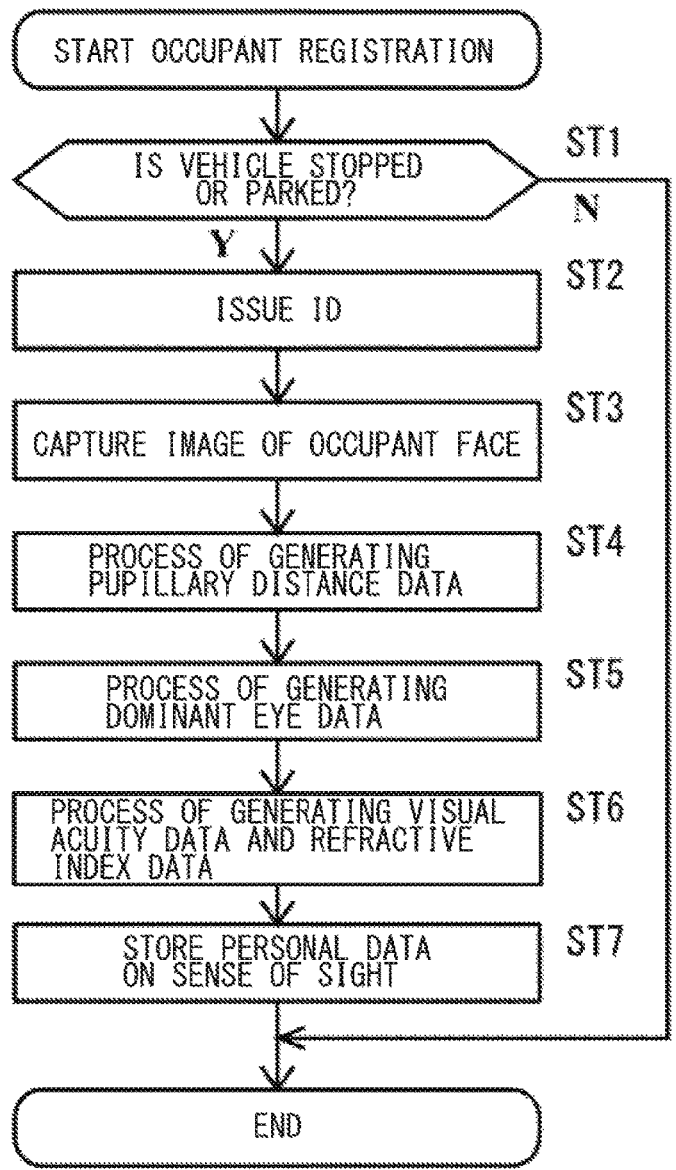
FIG. 7 is an explanatory diagram illustrating an example of personal data stored in an occupant monitoring memory illustrated in FIG. 6.
FIG. 8 is a flowchart illustrating an example of a process of registering an occupant performed by an occupant monitoring apparatus illustrated in FIG. 6.

FIG. 7 illustrates an example of the personal data 80 stored in the occupant monitoring memory 64 illustrated in FIG. 6.

The personal data 80 illustrated in FIG. 7 includes pieces of data on a plurality of occupants registered in the occupant monitoring apparatus 60.

The rows of the personal data 80 illustrated in FIG. 7 may correspond to respective persons.

The data of each person may include an ID (Identification Data) issued for the corresponding person, a registered image as an image of, for example, the face captured by the inside camera 61, and pieces of data on the sense of sight of the corresponding occupant. FIG. 7 illustrates an example in which a pupillary distance, a dominant eye, visual acuity of both eyes, and refractive indices of both eyes are stored as the pieces of data on the sense of sight of each occupant. These pieces of data may be acquired as a result of the determination based on the image captured by the inside camera 61, such as the registered image.

Referring to FIG. 6, the HUDECU 18 may be coupled to the projection device 71 and a HUD memory 72.

The projection device 71 may be provided on the dashboard 5 to face toward the windshield 6 as illustrated in FIG. 3. The projection device 71 may switch between the right-eye image 91 and the left-eye image 92 and project those images alternately onto the windshield 6 as illustrated in FIG. 5. The projection device 71 may thus project the three-dimensional image onto the windshield 6 provided in front of the occupant of the vehicle 1. Accordingly, the attention-seeking frame mark 90 with respect to the object, present outside of the vehicle 1 at a location ahead of the occupant, may be projected onto the windshield 6 at a position that is in a direction in which the object present outside of the vehicle 1 is to be visually recognized through the windshield 6. In one example, the projection device 71 may project, onto the windshield 6 and as the three-dimensional image, a projection image having, for example, an attention-seeking arrow mark that is so provided as to be near the object present outside of the vehicle 1 and that is directed toward the object present outside of the vehicle 1.

The HUD memory 72 may store, for example, a program intended for head-up displaying and setting data. The setting data may include a mark or a sign such as the attention-seeking frame mark 90 or the attention-seeking arrow mark.

The HUDECU 18 may load the program from the HUD memory 72 and execute the program. Thus, the HUDECU 18 may serve as a controller of the HUD apparatus 70.

The HUDECU 18 serving as the controller of the HUD apparatus 70 may acquire, from the detection ECU 16, the data on another mobile body present ahead of the vehicle 1. In a case where the HUDECU 18 has acquired the data on the other mobile body, the HUDECU 18 may select, for example, the attention-seeking frame mark 90 on the basis of the type of the other mobile body.

The HUDECU 18 may determine a position and a size of the attention-seeking frame mark in the right-eye image 91 and a position and a size of the attention-seeking frame mark in the left-eye image 92 such that, as seen from the occupant, the attention-seeking frame mark is overlaid on the other mobile body or is positioned near the other mobile body. After determining the positions and the sizes, the HUDECU 18 may decide the thus-determined positions and sizes of the attention-seeking frame marks.

The HUDECU 18 may generate the right-eye image 91 that includes the attention-seeking frame mark 93 having been subjected to the adjustment and the left-eye image 92 that includes the attention-seeking frame mark 94 having been subjected to the adjustment, and may output the right-eye image 91 and the left-eye image 92 to the projection device 71.

The projection device 71 may thus project, onto the windshield 6, the attention-seeking frame mark 93 belonging to the right-eye image 91 and the attention-seeking frame mark 94 belonging to the left-eye image 92.

Accordingly, the HUDECU 18 may acquire: the data from a detection apparatus including the stereo camera 43 that captures an image of an environment outside of the vehicle 1 and the detection ECU 16; and the data from the occupant monitoring apparatus 60 including the inside camera 61 that captures an image of the occupant inside the vehicle 1 and the occupant monitoring ECU 17. On the basis of the pieces of acquired data, the HUDECU 18 may project, onto the windshield 6, the three-dimensional image that is suitable for the occupant. Hence, in some embodiments, a head-up display system of the vehicle 1 may at least include the detection apparatus, the occupant monitoring apparatus 60, and the HUD apparatus 70.

FIG. 8 is a flowchart illustrating an example of a process of registering an occupant performed by the occupant monitoring apparatus 60 illustrated in FIG. 6.

The occupant monitoring ECU 17 may repeatedly execute the process illustrated by way of example in FIG. 8 in a case where a new occupant is to be registered.

In step ST1, the occupant monitoring ECU 17 may determine whether the vehicle 1 is stopped or parked. This step is for the occupant monitoring ECU 17 to determine whether the vehicle 1 is in a safe state. If the vehicle 1 is determined as not being stopped or parked, the occupant monitoring ECU 17 may end the process illustrated by way of example in FIG. 8. If the vehicle 1 is determined as being stopped or parked, the occupant monitoring ECU 17 may proceed the process to step ST2.

In step ST2, the occupant monitoring ECU 17 may issue a new ID for the new occupant.

In step ST3, the occupant monitoring ECU 17 may capture an image of the face of the occupant to acquire the registered image of the new occupant. For example, the occupant monitoring ECU 17 may acquire, with the inside camera 61, an image of at least the face of the occupant captured from the front. The occupant monitoring ECU 17 may acquire an image of the profile of the occupant facing the front of the vehicle 1, together with the image of the face of the occupant captured from the front.

In step ST4, the occupant monitoring ECU 17 may generate data on the pupillary distance as a distance between the right eye and the left eye both inclusive of the new occupant. For example, the occupant monitoring ECU 17 may determine a position of the right eye and a position of the left eye in the image of the face of the occupant captured from the front, and may generate the pupillary distance data on the basis of the distance between those captured positions in the image.

In step ST5, the occupant monitoring ECU 17 may generate data on the dominant eye of the new occupant. For example, the occupant monitoring ECU 17 may cause the projection device 71 of the HUD apparatus 70 to project a dominant-eye-determining projection image to determine the dominant eye of the occupant on the basis of an image captured upon the projection of the dominant-eye-determining projection image. The dominant-eye-determining projection image may include, for example, two bars that are positioned at the front and the rear and are seen with the dominant eye as being overlapped with each other.

In step ST6, the occupant monitoring ECU 17 may generate data on the visual acuity of both eyes and data on the refractive indices of both eyes of the new occupant. For example, the occupant monitoring ECU 17 may cause the projection device 71 of the HUD apparatus 70 to project a visual-acuity-determining projection image to determine the visual acuity and the refractive indices of both eyes of the occupant on the basis of an image captured upon the projection of the visual-acuity-determining projection image.

In step ST7, the occupant monitoring ECU 17 may cause the occupant monitoring memory 64 to store the personal data 80 related to the sense of sight of the occupant generated by the above example process, together with the issued ID and the registered image. Thus, the personal data 80 of a new registered user may be added and recorded to the personal data 80 illustrated in FIG. 7.

Figure 9:
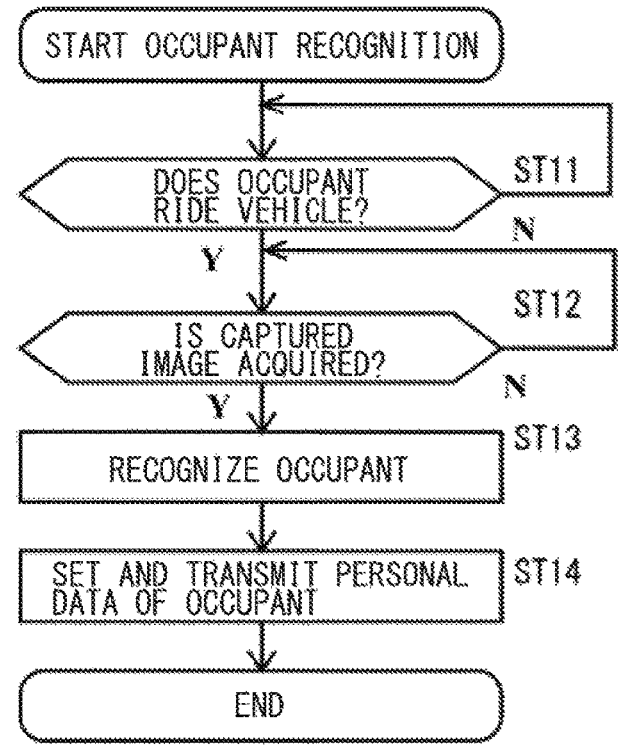
FIG. 9 is a flowchart illustrating an example of a process of recognizing an occupant performed by the occupant monitoring apparatus illustrated in FIG. 6.

FIG. 9 is a flowchart illustrating an example of a process of recognizing an occupant performed by the occupant monitoring apparatus 60 illustrated in FIG. 6.

The occupant monitoring ECU 17 may repeatedly execute the process illustrated by way of example in FIG. 9 in a case where an occupant rides the vehicle 1.

In step ST11, the occupant monitoring ECU 17 may determine whether the occupant rides the vehicle 1. If a determination is made that the occupant is not on board, the occupant monitoring ECU 17 may repeat the process of determining whether the occupant rides the vehicle 1 in step ST11. If a determination is made that the occupant rides the vehicle 1, the occupant monitoring ECU 17 may proceed the process to step ST12.

In step ST12, the occupant monitoring ECU 17 may determine whether a captured image of the occupant riding the vehicle 1 is acquired by the inside camera 61. If a determination is made that the captured image is not acquired, the occupant monitoring ECU 17 may repeat the process of determining whether the captured image of the occupant riding the vehicle 1 is acquired in step ST12. If a determination is made that the captured image is acquired, the occupant monitoring ECU 17 may proceed the process to step ST13.

In step ST13, the occupant monitoring ECU 17 may recognize the occupant on the basis of the captured image thus acquired. The occupant monitoring ECU 17 may compare the captured image with the plurality of registered images registered in the personal data 80 illustrated in FIG. 7 to generate a value of a degree of coincidence for each registered image. The occupant monitoring ECU 17 may recognize the registered user corresponding to the largest value of the degree of coincidence as the occupant.

In step ST14, the occupant monitoring ECU 17 may acquire the personal data 80 of the thus-recognized registered user from the personal data 80 stored in the occupant monitoring memory 64, and may set and transmit the personal data 80. The occupant monitoring ECU 17 may transmit the personal data 80 related to the sense of sight illustrated in FIG. 7 to the HUDECU 18. Thus, the HUDECU 18 may acquire the registered data related to the sense of sight of the occupant riding the vehicle 1.

Figure 10:
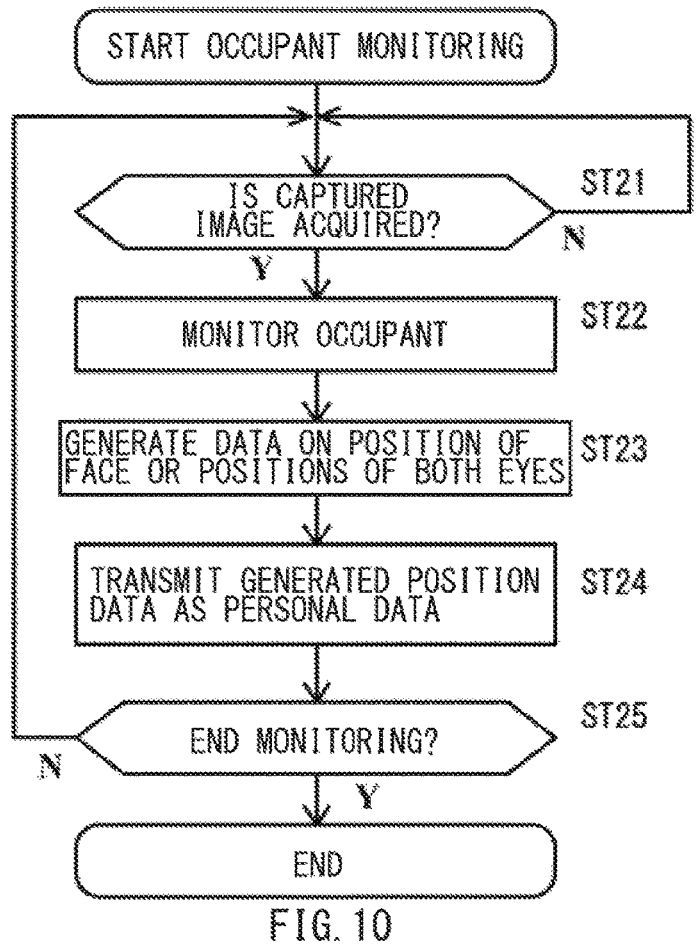
FIG. 10 is a flowchart illustrating an example of a process of monitoring the occupant performed by the occupant monitoring apparatus illustrated in FIG. 6.

FIG. 10 is a flowchart illustrating an example of a process of monitoring the occupant performed by the occupant monitoring apparatus 60 illustrated in FIG. 6.

The occupant monitoring ECU 17 may repeatedly execute, separately from the process illustrated in FIG. 9, the process illustrated by way of example in FIG. 10 in a case where the occupant rides the vehicle 1.

In step ST21, the occupant monitoring ECU 17 may determine whether a new captured image is acquired by the inside camera 61. If a determination is made that the new captured image is not acquired, the occupant monitoring ECU 17 may repeat the process of determining whether the new captured image is acquired in step ST21. If a determination is made that the new captured image is acquired, the occupant monitoring ECU 17 may proceed the process to step ST22.

In step ST22, the occupant monitoring ECU 17 may monitor the occupant. The occupant monitoring ECU 17 may determine the riding state of the occupant on the basis of the new captured image. For example, if the occupant is in a state of falling asleep or looking aside, the occupant monitoring ECU 17 may execute a monitoring process corresponding to the state of the occupant. In one example, the occupant monitoring ECU 17 may cause, with the UIECU 20, the display device 51 to display an image prompting the occupant to pay attention to the front.

In step ST23, the occupant monitoring ECU 17 may determine a position of the face or positions of both eyes of the occupant in the vehicle 1 on the basis of the new captured image acquired by the inside camera 61, and may generate data on the position of the face or the positions of both eyes of the occupant.

In step ST24, the occupant monitoring ECU 17 may transmit, to the HUDECU 18, the thus-generated data on the current position of the face or the current positions of both eyes of the occupant as the personal data 80.

In step ST25, the occupant monitoring ECU 17 may determine whether to end the monitoring of the occupant. For example, if the occupant stops or parks the running vehicle 1 and gets out of the vehicle 1, the occupant monitoring ECU 17 may determine to end the monitoring of the occupant and end the process illustrated by way of example in FIG. 10. If the occupant monitoring ECU 17 determines not to end the monitoring of the occupant, the occupant monitoring ECU 17 may return the process to step ST21 to repeat the example process described above.

Figure 11:
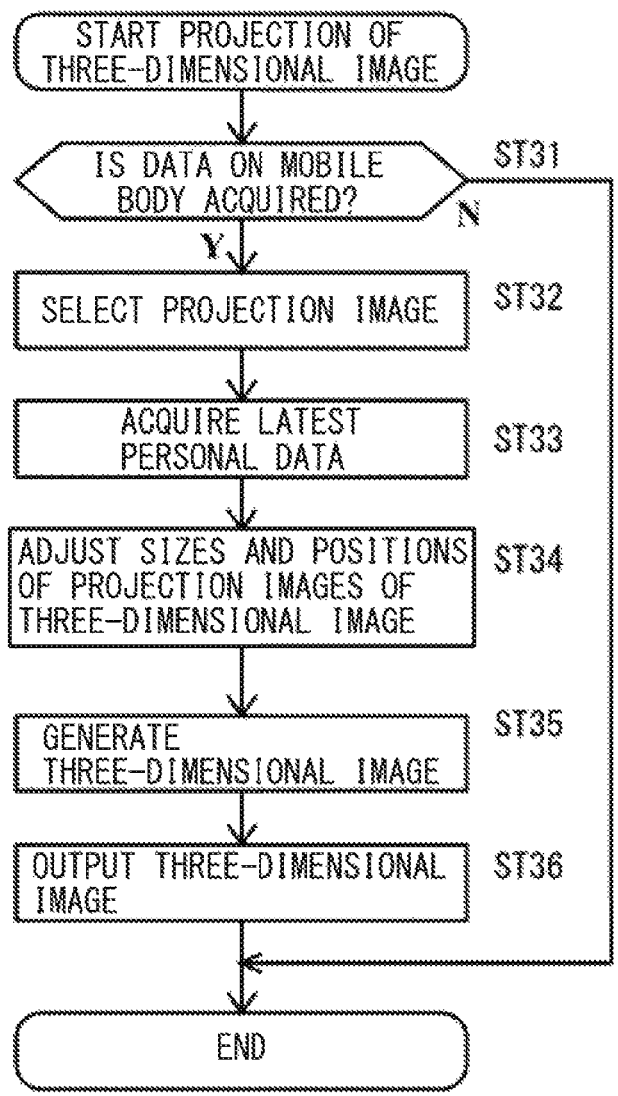
FIG. 11 is a flowchart illustrating an example of a process of projecting the three-dimensional image performed by a HUD apparatus illustrated in FIG. 6.

FIG. 11 is a flowchart illustrating an example of a process of projecting the three-dimensional image performed by the HUD apparatus 70 illustrated in FIG. 6.

The HUDECU 18 may repeatedly execute the process illustrated by way of example in FIG. 11 in a case where the occupant rides the vehicle 1.

In step ST31, the HUDECU 18 may determine whether the data on the mobile body present ahead of the vehicle 1 is acquired. For example, the HUDECU 18 may acquire the data on the mobile body present ahead of the vehicle 1 from the detection ECU 16. If the data on the mobile body present ahead of the vehicle 1 is determined as being acquired, the HUDECU 18 may proceed the process to step ST32. Otherwise, the HUDECU 18 may end the process illustrated by way of example in FIG. 11.

In step ST32, the HUDECU 18 may select the projection image to be projected, on the basis of the acquired data on the mobile body present ahead of the vehicle 1. The HUDECU 18 may select the projection image that corresponds to the mobile body. For example, the HUDECU 18 may select, as the projection image to be projected, a mark corresponding to the type of the mobile body from the plurality of attention-seeking marks stored in the HUD memory 72.

In step ST33, the HUDECU 18 may acquire the latest personal data 80. The latest personal data 80 may include the personal data 80 transmitted by the occupant monitoring ECU 17 in step ST14 illustrated in FIG. 9 and the personal data 80 transmitted by the occupant monitoring ECU 17 in step ST24 illustrated in FIG. 10. Thus, the HUDECU 18 may acquire, as the personal data 80 of the occupant, the data on the current position of the face or the current positions of both eyes of the occupant in addition to the data on the pupillary distance, the dominant eye, the visual acuity of both eyes, and the refractive indices of both eyes of the registered occupant.

In step ST34, the HUDECU 18 may determine a factor of the attention-seeking mark, such as the attention-seeking frame mark, in the right-eye image 91 of the three-dimensional image, on the basis of the current positions of both eyes of the occupant. The HUDECU 18 may also determine a factor of the attention-seeking mark, such as the attention-seeking frame mark, in the left-eye image 92 of the three-dimensional image, on the basis of the current positions of both eyes of the occupant. Non-limiting examples of the factor of the attention-seeking mark such as the attention-seeking frame mark may include a display position, a display size, a luminance, and a color. After determining the factors of the attention-seeking marks such as the attention-seeking frame marks, the HUDECU 18 may decide the thus-determined factors of the attention-seeking marks such as the attention-seeking frame marks.

In step ST35, the HUDECU 18 may generate, as the three-dimensional image, the right-eye image 91 including the attention-seeking frame mark 93 and the left-eye image 92 including the attention-seeking frame mark 94, on the basis of the determination in step ST34.

In step ST36, the HUDECU 18 may output the thus-generated three-dimensional image to the projection device 71. Thus, the right-eye image 91 including the attention-seeking frame mark 93 at a predetermined position and the left-eye image 92 including the attention-seeking frame mark 94 at a predetermined position may be, for example, switched alternately to be displayed on the windshield 6.

Accordingly, the HUDECU 18 of the HUD apparatus 70 adjusts a factor such as the position, the size, the luminance, or the color of the projection images in the three-dimensional image on the basis of the personal data 80, and causes the three-dimensional image to be projected from the projection device 71. The personal data 80 is generated by the occupant monitoring apparatus 60 and related to the sense of sight of the occupant.

The HUDECU 18 may identify the current position of the right eye and the current position of the left eye of the occupant, on the basis of the current position of the face and the pupillary distance as illustrated by way of example in FIG. 4. If the position of the face is shifted longitudinally, horizontally, or vertically, the position of the right eye and the position of the left eye shift longitudinally, horizontally, or vertically as well.

The HUDECU 18 may adjust the position of the projection image in the right-eye image 91 and the position of the projection image in the left-eye image 92 and decide those positions such that the corresponding projection image is overlapped with the line of sight of the right eye or the left eye with respect to the object present outside of the vehicle 1, such as the mobile body. The HUDECU 18 may calculate the line of sight of the right eye from the right eye to the object present outside of the vehicle 1 and the line of sight of the left eye from the left eye to the object present outside of the vehicle 1, on the basis of a relative distance and a direction of the object present outside of the vehicle 1 with respect to the windshield 6 and on the basis of the current position of the face with respect to the windshield 6 in the vehicle 1. For example, the HUDECU 18 may so adjust the position of the projection image as to cause the projection image in the image to be projected for the dominant eye to be positioned on the line of sight between the object present outside of the vehicle 1 and the dominant eye, and may further decide the position of the projection image in the image to be projected for the non-dominant eye on the basis of the pupillary distance.

The HUDECU 18 may adjust the size of the projection image in the right-eye image 91 and the size of the projection image in the left-eye image 92 on the basis of a proportion between a distance from the right eye to the object present outside of the vehicle 1 and a distance from the left eye to the object present outside of the vehicle 1, and decide the sizes of the projection images. For example, the HUDECU 18 may enlarge or reduce the size of the projection image in the left-eye image 92 intended for the non-dominant eye by using the proportion between the distance from the right eye to the object present outside of the vehicle 1 and the distance from the left eye to the object present outside of the vehicle 1, on the basis of the size of the projection image in the right-eye image 91 intended for the dominant eye as a reference. FIG. 4 illustrates an example in which the pedestrian as the object present outside of the vehicle 1 is positioned on the left side; hence, the projection image in the left-eye image 92 has the size enlarged as compared with the size of the projection image in the right-eye image 91. The size of the projection image may become smaller as the relative distance to the object present outside of the vehicle 1, such as the mobile body, becomes longer.

Thus, a difference in position, a difference in size, or both between the projection image in the right-eye image 91 and the projection image in the left-eye image 92 may be adjusted. Further, the projection image may be thus visually recognized by the dominant eye in such a manner that the projection image and the object present outside of the vehicle 1 are overlaid with each other at a desired level of overlying or become close to each other at a desired level of closeness.

The HUDECU 18 may adjust the difference in position, the difference in size, or both between the projection image in the right-eye image 91 as the three-dimensional image and the projection image in the left-eye image 92 as the three-dimensional image, on the basis of the visual acuity of both eyes, the refractive indices of both eyes, or both of the occupant. Thus, the positions, the sizes, or both of the projection images in the respective right-eye image 91 and left-eye image 92 as the three-dimensional image may be adjusted on the basis of the visual acuity of both eyes, the refractive indices of both eyes, or both that are physical characteristics of the occupant. Accordingly, the projection images may be so projected as to be visually recognized by the occupant easily.

The HUDECU 18 may adjust a factor of the projection image in the image intended for the dominant eye such that the projection image in the image intended for the dominant eye is visually recognized clearly as compared with the projection image in the image intended for the non-dominant eye. Non-limiting examples of the factor may include a luminance, a color, and clarity. This configuration makes it easier for the dominant eye to visually recognize the projection image clearly.

A description is now given in detail of the example processes from step ST4 to step ST6 illustrated in FIG. 8.

Figure 12:
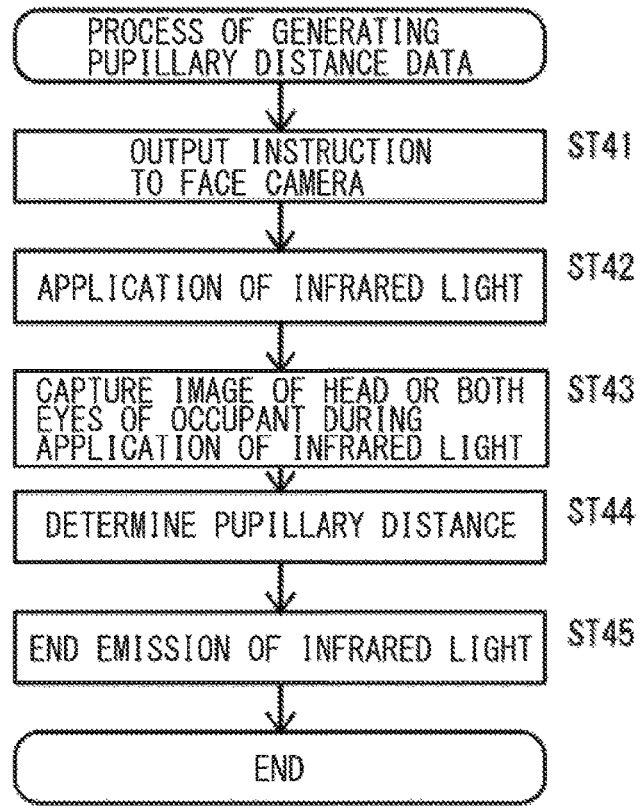
FIG. 12 is a flowchart illustrating an example of a detailed process of generating pupillary distance data performed in step ST4 illustrated in FIG. 8.

FIG. 12 is a flowchart illustrating an example of a detailed process of generating pupillary distance data performed in step ST4 illustrated in FIG. 8.

In step ST41, the occupant monitoring ECU 17 may output an instruction that prompts the occupant to face the inside camera 61. For example, the occupant monitoring ECU 17 may request the UIECU 20 to display an instruction screen that prompts the occupant to face the inside camera 61. The UIECU 20 may display the instruction screen that prompts the occupant to face the inside camera 61.

In step ST42, the occupant monitoring ECU 17 may turn on the infrared lamp 62. Thus, the face of the occupant facing the inside camera 61 may be irradiated with the infrared light.

In step ST43, the occupant monitoring ECU 17 may capture, with the inside camera 61, the image of the face or both eyes of the occupant during the application of the infrared light.

In step ST44, the occupant monitoring ECU 17 may analyze the image of the face or both eyes of the occupant captured from the front to determine the pupillary distance on the basis of the captured position of the right eye and the captured position of the left eye. The pupillary distance may be a distance between the right eye and the left eye both inclusive of the occupant as illustrated by way of example in FIG. 4.

In step ST45, the occupant monitoring ECU 17 may turn off the infrared lamp 62 to end the emission of the infrared light.

By performing the above example process, the occupant monitoring ECU 17 may generate the data on the pupillary distance of the occupant, as the data on the sense of sight of the occupant to be registered. The thus-generated pupillary distance data of the occupant may be stored in the occupant monitoring memory 64 as a part of the personal data 80 illustrated by way of example in FIG. 7.

The image of the front of the occupant may be captured under the safe state in which the vehicle 1 is not in motion and is clear without involving a blur accordingly. Hence, the occupant monitoring ECU 17 is able to generate the pupillary distance data of the occupant accurately on the basis of the clear image of the front of the occupant.

Figure 13:
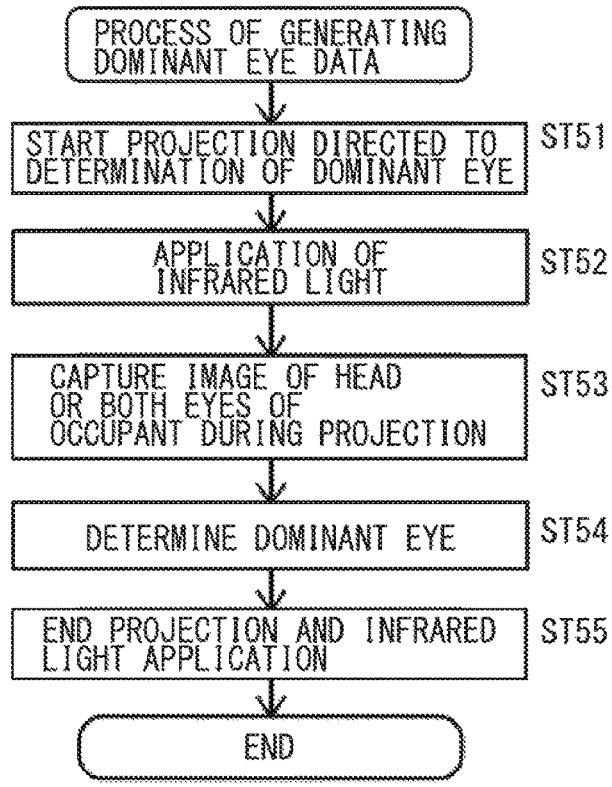
FIG. 13 is a flowchart illustrating an example of a detailed process of generating dominant eye data performed in step ST5 illustrated in FIG. 8.

FIG. 13 is a flowchart illustrating an example of a detailed process of generating dominant eye data performed in step ST5 illustrated in FIG. 8.

In step ST51, the occupant monitoring ECU 17 may start the projection directed to determination of the dominant eye. The occupant monitoring ECU 17 may instruct the HUDECU 18 to perform the projection directed to the determination of the dominant eye. The HUDECU 18 may cause the projection device 71 to display the dominant-eye-determining projection image. For example, the dominant-eye-determining projection image may include two bars that are positioned at the front and the rear and are seen with the dominant eye as being overlapped with each other. In the dominant-eye-determining projection image, the two bars positioned at the front and the rear are seen with the non-dominant eye as being shifted horizontally.

In step ST52, the occupant monitoring ECU 17 may turn on the infrared lamp 62. Thus, the face of the occupant seeing the dominant-eye-determining projection image may be irradiated with the infrared light.

In step ST53, the occupant monitoring ECU 17 may capture, with the inside camera 61, the image of the face or both eyes of the occupant during the projection of the dominant-eye-determining projection image.

In step ST54, the occupant monitoring ECU 17 may analyze the captured image of the face or both eyes of the occupant to determine the dominant eye on the basis of states of both eyes in the captured image. Alternatively, the occupant monitoring ECU 17 may determine the dominant eye on the basis of a selecting operation or a gesture performed by the occupant having been subjected to the capturing of the image, instead of analyzing the states of both eyes in the captured image.

In step ST55, the occupant monitoring ECU 17 may turn off the infrared lamp 62 and end the projection performed by the HUDECU 18.

By performing the above example process, the occupant monitoring ECU 17 may generate the data on the dominant eye of the occupant on the basis of the image of the face of the occupant captured by the inside camera 61. The thus-generated dominant eye data of the occupant may be stored in the occupant monitoring memory 64 as a part of the personal data 80 illustrated by way of example in FIG. 7.

The image of the occupant may be captured under the safe state in which the vehicle 1 is not in motion and is clear without involving a blur accordingly. Hence, the occupant monitoring ECU 17 is able to generate the dominant eye data of the occupant accurately on the basis of the clear image of the occupant.

Figure 14:
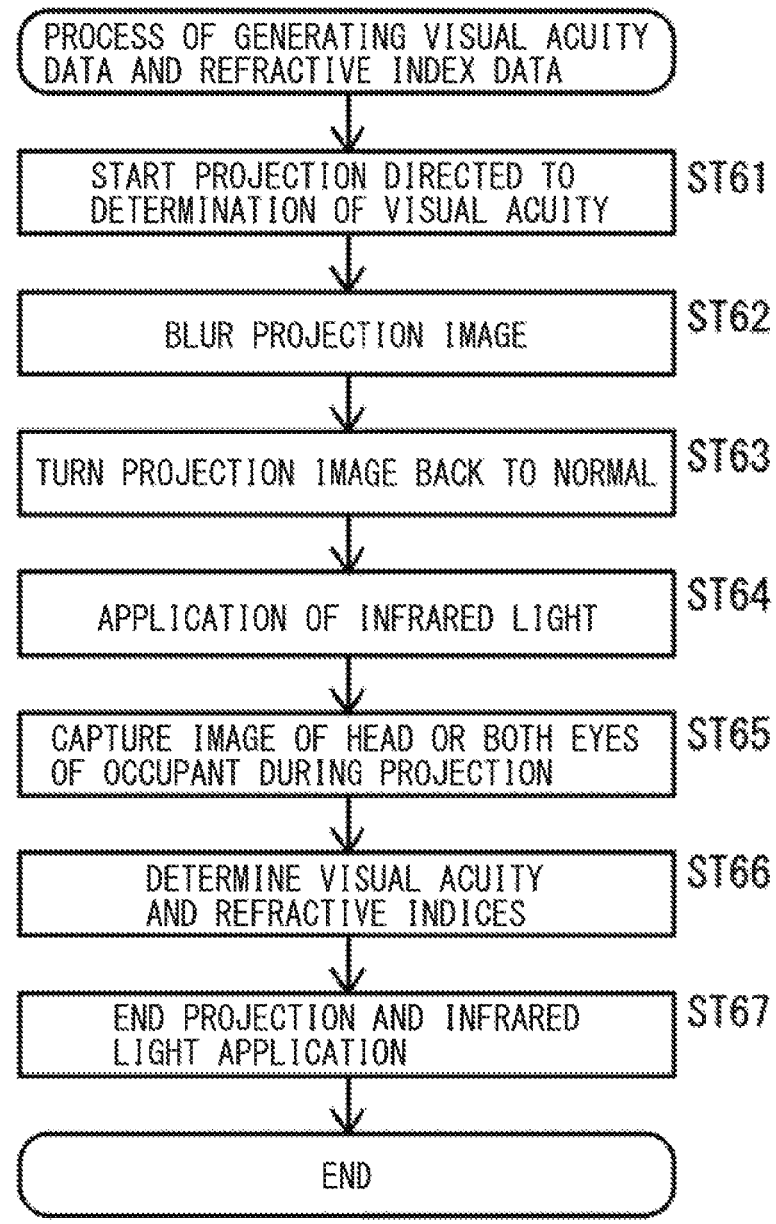
FIG. 14 is a flowchart illustrating an example of a detailed process of generating visual acuity data and refractive index data performed in step ST6 illustrated in FIG. 8.

FIG. 14 is a flowchart illustrating an example of a detailed process of generating visual acuity data and refractive index data performed in step ST6 illustrated in FIG. 8.

In step ST61, the occupant monitoring ECU 17 may start the projection directed to determination of the visual acuity. The occupant monitoring ECU 17 may instruct the HUDECU 18 to perform the projection directed to the determination of the visual acuity. The HUDECU 18 may cause the projection device 71 to display a visual-acuity-determining projection image. For example, the visual-acuity-determining projection image may include an image of a balloon that moves to the front and the rear with respect to the occupant. Upon the projection of the visual-acuity-determining projection image, the occupant moves his/her both eyes such that the lines of sight of both eyes come into coincidence with a front-rear position of the balloon.

In step ST62, the occupant monitoring ECU 17 may output, to the HUDECU 18, an instruction to blur the projection image. The HUDECU 18 may so deform the projection image that an outline of the projection image being projected is temporarily blurred.

In step ST63, the occupant monitoring ECU 17 may output, to the HUDECU 18, an instruction to turn the blurred projection image back to normal. The HUDECU 18 may turn the blurred outline of the projection image back to normal.

In step ST64, the occupant monitoring ECU 17 may turn on the infrared lamp 62. Thus, the face of the occupant seeing the visual-acuity-determining projection image may be irradiated with the infrared light.

In step ST65, the occupant monitoring ECU 17 may capture, with the inside camera 61, the image of the face or both eyes of the occupant during the projection of the visual-acuity-determining projection image.

In step ST66, the occupant monitoring ECU 17 may analyze the captured image of the face or both eyes of the occupant to determine the visual acuity and the refractive indices of both eyes on the basis of states of both eyes in the captured image. The visual acuity and the refractive indices of both eyes may be determined on the basis of any method used for an ordinary visual acuity examination.

In step S67, the occupant monitoring ECU 17 may turn off the infrared lamp 62 and end the projection performed by the HUDECU 18.

By performing the above example process, the occupant monitoring ECU 17 may generate the data on the visual acuity and the data on the refractive indices of the occupant on the basis of the image of the face of the occupant captured by the inside camera 61. The thus-generated visual acuity data and refractive index data of the occupant may be stored in the occupant monitoring memory 64 as a part of the personal data 80 illustrated by way of example in FIG. 7.

The image of the occupant may be captured under the safe state in which the vehicle 1 is not in motion and is clear without involving a blur accordingly. Hence, the occupant monitoring ECU 17 is able to generate the visual acuity data and refractive index data of the occupant accurately on the basis of the clear image of the occupant.

Further, the outline of the projection image may be temporarily blurred before the capturing of the image, allowing both eyes of the occupant to be relaxed upon the capturing of the image and thus making both eyes to be in a favorable state for the measurement.

According to at least one embodiment of the technology, the occupant monitoring apparatus 60 generates, for the HUD apparatus 70, the personal data 80 related to the sense of sight of the occupant, on the basis of the image captured by the inside camera 61 that captures the image of the occupant of the vehicle 1. The HUD apparatus 70 adjusts a factor such as the position, the size, the luminance, or the color of the projection images in the three-dimensional image on the basis of the personal data 80 that is generated by the occupant monitoring apparatus 60 and related to the sense of sight of the occupant, and projects the adjusted three-dimensional image from the projection device 71. Thus, at least one embodiment of the technology makes it possible to favorably solve the difference in terms of the sense of distance between the projection image derived from the three-dimensional image and the object present outside of the vehicle. At least one embodiment of the technology allows the projection image in the three-dimensional image, which is to be projected with respect to the object present outside of the vehicle 1 at a location ahead of the vehicle, such as the attention-seeking frame mark 90 or the attention-seeking arrow mark, to be seen from the occupant as if the projection image is positioned near or is overlaid on the object present outside of the vehicle 1 at a location ahead of the vehicle.

For example, the presence of the difference in terms of the sense of distance between the three-dimensional projection image and the object present outside of the vehicle can cause the occupant to experience the feeling of strangeness between them, or can make the occupant feel sick due to the frequent movement of the line of sight therebetween. According to at least one embodiment of the technology, it is possible to alleviate or prevent such concerns.

In some embodiments, the difference in position between the projection images in the respective right-eye image 91 and left-eye image 92 as the three-dimensional image may be adjusted on the basis of the pupillary distance as the physical characteristic of the occupant and on the basis of the current position of the face or the current positions of both eyes of the occupant in the vehicle 1. Thus, it becomes easier for the occupant to see the projection image as if the projection image is positioned near or is so positioned as to be overlaid on the object present outside of the vehicle 1 at a location ahead of the vehicle as seen from the occupant. Hence, it is possible to effectively reduce the difference in terms of the sense of distance between the projection image derived from the three-dimensional image and the object present outside of the vehicle.

In some embodiments, the difference in size between the projection images in the respective right-eye image 91 and left-eye image 92 as the three-dimensional image may be adjusted on the basis of the pupillary distance as the physical characteristic of the occupant and on the basis of the current position of the face or the current positions of both eyes of the occupant in the vehicle 1. For example, the difference in size between the projection images in the respective right-eye image 91 and left-eye image 92 may be adjusted on the basis of the pupillary distance and on the basis of the position of the face or the positions of both eyes, such that a relative size of the projection image based on, as a reference, the size of the object present outside of the vehicle 1 in a field of view of the right eye and a relative size of the projection image based on, as a reference, the size of the object present outside of the vehicle 1 in a field of view of the left eye become the same. Thus, the projection image for the right eye and the projection image for the left eye are seen from the occupant as being the same therebetween with respect to the object present outside of the vehicle at a location ahead of the vehicle 1. Hence, it makes it easier for the occupant to recognize the projection image for the right eye and the projection image for the left eye as an image for the same object.

Owing to visual adjustment effects exemplified as described above, it makes it easier for the occupant to visually recognize a real image of the projection image as if the real image of the projection image is provided near or is overlaid on the object present outside of the vehicle 1. Thus, the occupant visually recognizes the projection image as if the real image of the projection image is provided near or is overlaid on the object present outside of the vehicle 1. Hence, it makes it difficult for the occupant to experience the feeling of strangeness between the projection image and the object present outside of the vehicle.

Although some example embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A head-up display system for a vehicle, the head-up display system comprising:
   a head-up display apparatus including
      a projection device, the projection device being configured to project a three-dimensional image in front of an occupant of the vehicle,
      the head-up display apparatus being configured to project a projection image with respect to an object that is present outside of the vehicle at a location ahead of the occupant; and
   an occupant monitoring apparatus including
      an imaging device, the imaging device being configured to capture an image of the occupant,
      the occupant monitoring apparatus being configured to generate personal data related to a sense of sight of the occupant on a basis of the captured image of the occupant obtained by the imaging device, wherein
   the head-up display apparatus is configured to adjust the projection image in the three-dimensional image on a basis of the personal data generated by the occupant monitoring apparatus, and project, from the projection device, the three-dimensional image in which the projection image is adjusted, wherein
   the occupant monitoring apparatus is configured to generate, as the personal data, data on visual acuity of both eyes of the occupant or data on refractive indices of the both eyes of the occupant, on a basis of an image of the both eyes of the occupant captured by the imaging device, and
   the head-up display apparatus is configured to adjust a difference in position or size between the projection image in a right-eye image and the projection image in a left-eye image on a basis of the data on the visual acuity or the data on the refractive indices, the right-eye image and the left-image being configured to be projected as the three-dimensional image.

2. The head-up display system for the vehicle according to claim 1, wherein
   the occupant monitoring apparatus is configured to
      generate, as the personal data, data on a position of a face of the occupant or data on positions of both eyes of the occupant, on a basis of the captured image of the occupant, and
      generate, as the personal data, data on a pupillary distance on the basis of the captured image of the occupant,
         the pupillary distance being a distance between right eye and left eye both inclusive of the occupant, and
   the head-up display apparatus is configured to
   switch between a right-eye image that includes the projection image and a left-eye image that includes the projection image to project, as the three-dimensional image, the right-eye image and the left-eye image,
   adjust a difference in size between the projection image in the right-eye image and the projection image in the left-eye image on a basis of the data on the pupillary distance, and
   adjust, in a same direction, the position of the projection image in the right-eye image and the position of the projection image in the left-eye image, on a basis of the data on the position of the face of the occupant or the data on the positions of the both eyes of the occupant.

3. The head-up display system for the vehicle according to claim 2, wherein the occupant monitoring apparatus is configured to
   capture, with the imaging device, an image of the face or the both eyes of the occupant, when the vehicle is in a safe state, and
   determine the pupillary distance on a basis of the positions of the both eyes in the captured image of the both eyes to generate the data on the pupillary distance.

4. The head-up display system for the vehicle according to claim 2, wherein
   the occupant monitoring apparatus is configured to generate, as the personal data, data on a dominant eye of the occupant on a basis of an image of the face of the occupant captured by the imaging device, and
   the head-up display apparatus is configured to adjust the position of the projection image in one of the right-eye image and the left-eye image to cause the projection image in the one of the right-eye image and the left-image to be located at a position that is based on, as a reference, a line of sight between the object present outside of the vehicle and the dominant eye, the one of the right-eye image and the left-image being an image for the dominant eye, the right-eye image and the left-image being configured to be projected as the three-dimensional image.

5. The head-up display system for the vehicle according to claim 2, wherein
   the occupant monitoring apparatus is configured to generate, as the personal data, data on a dominant eye of the occupant on a basis of an image of the face of the occupant captured by the imaging device, and
   the head-up display apparatus is configured to adjust the projection image in one of the right-eye image and the left-eye image to cause the projection image in the one of the right-eye image and the left-image to be visually recognized by the occupant easier than the projection image in the other of the right-eye image and the left-eye image, the one of the right-eye image and the left-image being an image for the dominant eye, the right-eye image and the left-image being configured to be projected as the three-dimensional image.

6. The head-up display system for the vehicle according to claim 2, wherein the occupant monitoring apparatus is configured to
   cause the head-up display apparatus to project a visual-acuity-determining projection image that is directed to determination of the visual acuity, when the vehicle is in a safe state,
   capture, with the imaging device, an image of face or the both eyes of the occupant while the visual-acuity-determining projection image is projected, and
   determine the visual acuity or the refractive indices of the both eyes of the occupant on a basis of states of the both eyes in the captured image of the face or the both eyes to generate the data on the visual acuity or the data on the refractive indices.

7. The head-up display system for the vehicle according to claim 6, wherein the head-up display apparatus is configured to
change the visual-acuity-determining projection image to project the visual-acuity-determining projection image, by blurring the visual-acuity-determining projection image and turning the blurred visual-acuity-determining projection image back to normal, and
capture, with the imaging device, the image of the face or the both eyes of the occupant while the visual-acuity-determining projection image having been turned back to the normal is projected.

8. A head-up display system for a vehicle, the head-up display system comprising:
a head-up display apparatus including
a projection device, the projection device being configured to project a three-dimensional image in front of an occupant of the vehicle,
the head-up display apparatus being configured to project a projection image with respect to an object that is present outside of the vehicle at a location ahead of the occupant; and
an occupant monitoring apparatus including
an imaging device, the imaging device being configured to capture an image of the occupant,
the occupant monitoring apparatus being configured to generate personal data related to a sense of sight of the occupant on a basis of the captured image of the occupant obtained by the imaging device, wherein
the head-up display apparatus is configured to adjust the projection image in the three-dimensional image on a basis of the personal data generated by the occupant monitoring apparatus, and project, from the projection device, the three-dimensional image in which the projection image is adjusted, wherein
the occupant monitoring apparatus is configured to generate, as the personal data, data on a dominant eye of the occupant on a basis of an image of a face of the occupant captured by the imaging device, and
the head-up display apparatus is configured to adjust a position of the projection image in one of a right-eye image and a left-eye image to cause the projection image in the one of the right-eye image and the left-image to be located at a position that is based on, as a reference, a line of sight between the object present outside of the vehicle and the dominant eye, the one of the right-eye image and the left-image being an image for the dominant eye, the right-eye image and the left-image being configured to be projected as the three-dimensional image, wherein
the occupant monitoring apparatus is configured to cause the head-up display apparatus to project a dominant-eye-determining projection image that is directed to determination of the dominant eye, when the vehicle is in a safe state,
capture, with the imaging device, an image of the face or both eyes of the occupant while the dominant-eye-determining projection image is projected, and
determine the dominant eye of the occupant on a basis of states of the both eyes in the captured image of the face or the both eyes to generate the data on the dominant eye.

9. The head-up display system for the vehicle according to claim 8, wherein
the occupant monitoring apparatus is configured to generate, as the personal data, data on a dominant eye of the occupant on a basis of an image of a face of the occupant captured by the imaging device, and
the head-up display apparatus is configured to adjust the projection image in one of a right-eye image and a left-eye image to cause the projection image in the one of the right-eye image and the left-image to be visually recognized by the occupant easier than the projection image in the other of the right-eye image and the left-eye image, the one of the right-eye image and the left-image being an image for the dominant eye, the right-eye image and the left-image being configured to be projected as the three-dimensional image.

10. The head-up display system for the vehicle according to claim 1, wherein the occupant monitoring apparatus is configured to
cause the head-up display apparatus to project a visual-acuity-determining projection image that is directed to determination of the visual acuity, when the vehicle is in a safe state,
capture, with the imaging device, an image of face or the both eyes of the occupant while the visual-acuity-determining projection image is projected, and
determine the visual acuity or the refractive indices of the both eyes of the occupant on a basis of states of the both eyes in the captured image of the face or the both eyes to generate the data on the visual acuity or the data on the refractive indices.

11. The head-up display system for the vehicle according to claim 10, wherein the head-up display apparatus is configured to
change the visual-acuity-determining projection image to project the visual-acuity-determining projection image, by blurring the visual-acuity-determining projection image and turning the blurred visual-acuity-determining projection image back to normal, and
capture, with the imaging device, the image of the face or the both eyes of the occupant while the visual-acuity-determining projection image having been turned back to the normal is projected.

* * * * *